United States Patent
Sanchez et al.

(10) Patent No.: US 10,107,014 B2
(45) Date of Patent: Oct. 23, 2018

(54) SECURITY SYSTEM WITH ANTI-TAMPERING SENSORS AND CYBERSECURITY

(71) Applicant: OpticalLock, Inc., La Mesa, CA (US)

(72) Inventors: Jorge Sanchez, Poway, CA (US); Carol E. Fuller, Santee, CA (US)

(73) Assignee: OpticalLock, Inc., La Mesa, CA (US)

( * ) Notice: Subject to any disclaimer, the term of this patent is extended or adjusted under 35 U.S.C. 154(b) by 16 days.

(21) Appl. No.: 15/345,293

(22) Filed: Nov. 7, 2016

(65) Prior Publication Data

US 2017/0058565 A1   Mar. 2, 2017

Related U.S. Application Data

(63) Continuation-in-part of application No. 15/252,045, filed on Aug. 30, 2016.
(Continued)

(51) Int. Cl.
*E05B 45/00* (2006.01)
*E05B 45/06* (2006.01)
(Continued)

(52) U.S. Cl.
CPC ............ *E05B 45/061* (2013.01); *A61J 1/03* (2013.01); *B65D 50/00* (2013.01); *E05B 37/0068* (2013.01); *E05B 39/005* (2013.01); *E05B 45/005* (2013.01); *E05B 49/00* (2013.01); *G01M 11/088* (2013.01);
(Continued)

(58) Field of Classification Search
None
See application file for complete search history.

(56) References Cited

U.S. PATENT DOCUMENTS 3,854,792 A   12/1974 Koelle
4,447,123 A    5/1984 Page et al.
(Continued)

FOREIGN PATENT DOCUMENTS

JP   2010174478 A  *  8/2010
JP   2010174478 A     8/2010

OTHER PUBLICATIONS

International Search Report dated Dec. 15, 2016 in related International Application No. PCT/US2016/049489, filed Aug. 30, 2016.
(Continued)

*Primary Examiner* — Charlie Y Peng
(74) *Attorney, Agent, or Firm* — Knobbe Martens Olson & Bear LLP

(57) ABSTRACT

The disclosed embodiments include a method for tamper-proof protection of containers used for shipment of goods. The system contains a lock with electronic and mechanical components and a controller. A sensor is connected to a lock so that if forms a closed loop. The sensor can be an optical fiber or a distributed arrangement with an optical or an electrical shield. The electronics in the lock provide real time monitoring of the status of the lock. The lock cannot be opened or reproduced due to the signature of the closed loop which is stored in a remote server. Intrusions detected are relayed to an authorized recipient via a variety of communication channels. The data and control of the entire system is protected with several programs targeted to provide cybersecurity.

23 Claims, 12 Drawing Sheets

Related U.S. Application Data

(60) Provisional application No. 62/252,555, filed on Nov. 8, 2015, provisional application No. 62/211,816, filed on Aug. 30, 2015.

(51) Int. Cl.

| | | |
|---|---|---|
| *E05B 37/00* | (2006.01) | |
| *E05B 39/00* | (2006.01) | |
| *E05B 49/00* | (2006.01) | |
| *A61J 1/03* | (2006.01) | |
| *B65D 50/00* | (2006.01) | |
| *G01M 11/08* | (2006.01) | |
| *G01M 11/00* | (2006.01) | |
| *G08B 13/186* | (2006.01) | |
| *G09F 3/03* | (2006.01) | |
| *G08B 13/12* | (2006.01) | |
| *G09F 3/02* | (2006.01) | |

(52) U.S. Cl.
CPC ........... *G01M 11/31* (2013.01); *G08B 13/126* (2013.01); *G08B 13/186* (2013.01); *G09F 3/0329* (2013.01); *G09F 3/0376* (2013.01); *E05B 2045/0685* (2013.01); *G09F 2003/0273* (2013.01)

(56) References Cited

U.S. PATENT DOCUMENTS

| | | |
|---|---|---|
| 4,688,891 A | 8/1987 | Carratt et al. |
| 5,104,391 A | 4/1992 | Ingle et al. |
| 5,499,017 A | 3/1996 | Beigel |
| 5,592,149 A | 1/1997 | Alizi |
| 5,613,388 A | 3/1997 | Murphree |
| RE37,011 E | 1/2001 | Dawson et al. |
| 6,304,713 B1 | 10/2001 | Isogai et al. |
| 6,420,971 B1* | 7/2002 | Leck ................. E05B 39/04 340/542 |
| 7,471,203 B2 | 12/2008 | Worthy et al. |
| 7,482,924 B1 | 1/2009 | Beinhocker |
| 8,982,360 B2 | 3/2015 | Zhao et al. |
| 2003/0151492 A1 | 8/2003 | Renfroe |
| 2006/0083458 A1 | 4/2006 | Iffergan |
| 2006/0250235 A1* | 11/2006 | Astrin ................. G08B 25/009 340/539.22 |
| 2007/0120381 A1 | 5/2007 | Ehrensvard et al. |
| 2010/0014071 A1 | 1/2010 | Hartog |
| 2013/0055773 A1 | 3/2013 | Li |
| 2015/0017402 A1 | 1/2015 | Suzuki et al. |
| 2015/0226637 A1 | 8/2015 | Sanchez et al. |

OTHER PUBLICATIONS

ABUS, "Container Lock Granit 215/100, More Security for Containers" ABUS Security Tech Germany, Jan. 2009 (Jan. 2009), p. 1-2.

Swedberg, "TrakLok Offers Hybrid System for Tracking Containers" RFID Journal Jun. 3, 2011 (Jun. 3, 2011, entire document [online] URL=http://www.rfidjournal.com/articles/view?8504>.

International Search Report and Written Opinion dated Mar. 27, 2017 in related International Application No. PCT/US2016/060828, filed Nov. 7, 2016.

International Preliminary Report on Patentability dated Jan. 16, 2018 in related International Application No. PCT/US2016/060828, filed Nov. 7, 2016.

* cited by examiner

SECURITY SYSTEM WITH ANTI-TAMPERING SENSORS AND CYBERSECURITY

INCORPORATION BY REFERENCE TO ANY PRIORITY APPLICATIONS

This application claims the benefit of U.S. Provisional Application No. 62/252,555, filed Nov. 8, 2015. This application is also a continuation-in-part of U.S. patent application Ser. No. 15/252,045, filed Aug. 30, 2016, which claims priority to U.S. Provisional Application No. 62/211,816, filed on Aug. 30, 2015. Any and all applications for which a foreign or domestic priority claim is identified in the Application Data Sheet as filed with the present application are hereby incorporated by reference under 37 CFR 1.57.

BACKGROUND

Field

The presently disclosed embodiments relate to the prevention of tampering with a container of products to prevent substituting counterfeit products in the container, prevent theft and unauthorized access in general, and to prevent counterfeit duplication of the device itself.

Description of the Related Art

Shipping containers used for sea and land transport of goods are especially vulnerable to intrusion when left in a holding yard such as at a freight forwarder. Containers can be compromised when illegally removed from holding yards or hijacked while in transit. An emerging issue noted especially by military shippers is a breach of the container through its walls rather than through the container doors. Once a wall—breach occurs, the intruders can replace and repair the hole to make the container appear untouched. Detection of the breach becomes problematic for the shipper and the recipient of the goods until the time the contents are carefully examined. Often the time between a breach and examination can be lengthy, making it impossible to recover the lost goods and track down the intruders.

Globalization of product manufacturing has brought a significant challenge to consumers in that many products are substituted by counterfeits during and after manufacture, throughout portions of the supply chain and during transit. These counterfeit products do not perform as intended causing significant financial losses, jeopardizing national security and endangering the health of individuals. Counterfeiters often attack the supply chain for electronic parts, costly mechanical parts, expensive perfumes and cosmetics, and medicines and more. Some of counterfeiting examples include: medicines, which can be substituted with chemicals with life threatening consequences; bolts which go into critical locations such as bridges and aircraft; fire extinguishers containing compressed air which cannot perform in urgent situations; and electronic parts that are installed in national defense systems which reduce reliability and performance, further causing life threatening situations.

Present solutions include the utilization of Radio Frequency Identification (RFID) tags. These tags are devices that are attached to the products or shipping container. They include an identification code and in some cases manufacturing information about the part. During shipment and at different locations of the supply chain, the RFID tags are scanned by equipment that applies radio frequencies to the tag and reads the identity of the part to determine if the tag will return the correct information. If this is the case, then the product is believed to be authentic. To increase assurance of authenticity, a seal can be placed on a container which is designed in such a way to show whether or not it has been broken. However, seals currently available today can be replaced by a counterfeited seal, making it virtually impossible to detect an unauthorized entry into the container.

Shipping and logistic services suppliers are able to check the part in transit at various locations to determine if the RFID tag returns the expected information.

However, the use of RFID tags has significant weaknesses. When used in a box or package containing products it only ensures the box or package that carries the authenticity tag to be good. The box or package contents can be counterfeit and could have been changed somewhere in the supply chain during transit, at a warehouse, or in the vehicle during transportation between supply chain locations.

If the RFID tag is used to tag individual items, a known counterfeiting approach is to remove the tag and place the tag on a counterfeit item, then selling the authentic part to another customer, resulting in increased profits to the counterfeiter. There are companies that sell "tamper-proof" tags. However, counterfeiters will use patient and meticulous chemical procedures to dissolve the adhesive on the tag in the same manner they use processes to re-label and polish semiconductor packages. Placement of a tag on each individual product has the added disadvantage of increasing cost. For example, if added to each bolt in a shipment it will add tens of cents to the cost of the bolt. It would be costly and impractical to add RFID tags to each integrated circuit, which are put in the customary shipping tubes. Further, the tag would interfere with the automatic insertion process machines used to build electronic assemblies. Furthermore, a tag cannot be added to many of the miniature electronic devices such as resistors, capacitors, and many increasingly smaller integrated circuit packages, which are much smaller than an RFID tag. For example, the dimensions of a 01005 resistor is only 0.4 mm by 0.2 mm; placing a tag on one of these devices is neither physically nor economically feasible. Critical mechanical parts have had tags inserted in the part itself. This approach will also be subject for tag removal or hacking of the tag code, and will only be successful using the more complex tags with a read block. In this last case there will be a significant cost increase and the addition of the tag embedded in the part can affect its performance.

In addition to the limitations described above, RFID tags can be hacked where the part information can be read and placed in another fresh tag which can then be attached to a counterfeit product. RFID tags vary in price from 10 cents to several dollars each. Some of them have a "read block" feature in place meant to prevent tampering, however, this feature requires a State Machine or a processor function to be placed in the tag, therefore only the more costly tags will have the feature. The read block tags will individually be placed in the more costly products, but they will still be subject to the issues previously described.

Attempts have been made to include tags made out of paper used to seal the package, plastic wrap, or molten metal devices embodying wires at both sides of container lids. However, these sealing methods only present a temporary challenge to counterfeits, who, with enough effort in a workshop and with minimal equipment can replace products with counterfeits in containers, reproduce the seals and reattach RFID tags. If tags are not write-read-write protected internally, they can be readily counterfeited.

There are approaches used by the prior art where a shipping container holding parts is irradiated with electromagnetic signals of varying frequencies and a signature is obtained, which is then compared to a similar measurement made at the receiving location. Alternatively a prior electromagnetic measurement characterization is made of a typical system and used as the standard for authenticity. Depending on the signature reflected by the materials in the container, an assessment is made about the authenticity of the parts. Electromagnetic radiation is subject to substantial reflections from the surrounding environment, the parts in the shipping container, and the physical position of the test equipment. These reflections will distort the measurement, and add noise to the reflected radiation, which will affect repeatability and reliability of the measurement. Results are often influenced by the skill level of the test operator and their ability to interpret the test equipment results. Another disadvantage is irradiation equipment and its use is an expensive and time consuming method for parts authenticity testing, and cannot be used on items where irradiation can affect product performance.

There are other approaches that use a tool to radiate light into the package under test. This is often used to detect counterfeit medicines. When the light is reflected, the tool is able to detect the presence of a few known chemicals, due to effects such as fluorescence characteristics. If these chemicals reflect light that corresponds to a different chemical to what is known to be contained in the medicine, the package is thought to be a counterfeit. Comparison and evaluation of the detected light is subjective in that the color on the display of the test tool is not a clear-cut choice and is subject to interpretation errors. Another disadvantage is chemical testing of medicines is often destructive, which means only a small sample may be evaluated, thus leaving the greater part of a shipment untested. Statistical probability of detecting all counterfeit medicines in a particular shipment through sample testing is very low, which leads to ongoing uncertainty about the integrity and quality of any particular shipment.

The market for medicines deserves special mention since the consequences of counterfeits are life threatening and potentially epidemic in scale. Over-the-counter medicines are placed in containers having a cap sealed with a plastic wrap that is tightly shrunk around the cap. This cap can be reproduced and containers with medicines can be replaced with counterfeits. Large shipments of medicines shipped in bulk to pharmacists can be shipped with RFID tags, but have the issues previously described above.

Reliance on the use of RFID tags only as a means to prevent counterfeit parts, means there must be extensive inspection of all components of any particular shipment, which increases the cost of counterfeit parts detection. This cost in turn is passed onto the end consumer.

SUMMARY

One inventive aspect relates to a system for detecting tampering, comprising: a sensor with two opposing ends; and a lock body connected to the two opposing ends of the sensor, the lock body comprising: a transmitter configured to transmit a signal through the sensor; and a receiver configured to receive the signal from the sensor.

In the above system, the lock body can include a combination lock configured to receive an input by a user, wherein the combination lock can be configured to disconnect one of the two opposing ends of the sensor.

In the above system, one end of the sensor is fixed to the lock body and connected to the receiver.

In the above system, the sensor can include an optical fiber.

In the above system, the sensor can include an electrical conductor.

In the above system, the lock body can be coupled to at least one additional sensor.

In the above system, the at least one additional sensor can include an electrical shield wallpaper arranged around the container.

In the above system, the at least one additional sensor can include an optical shield wallpaper arranged around the container.

In the above system, the at least one additional sensor can be wirelessly connected to the lock.

The system can further comprise a plurality of additional sensors, wherein each of the external sensors is configured to respectively communicate with the lock body via wired or wireless communication.

In the above system, the lock body can further include: a latching hole configured to receive a first one of the two opposing ends of the sensor, wherein the latching hole is configured to release the first end; and a fixed hole configured to receive a second one of the two opposing ends of the sensor, wherein the fixed hole is configured to not release the second opposing end of the sensor.

In the above system, the lock body can further include a first cable connected to the fixed hole and the receiver and configured to transmit the sensor signal received at the fixed hole to the receiver.

The system can further comprise a second cable configured to transmit a sensor signal from the driver circuit to the end of the sensor inside the latching hole.

In the above system, the first and second cables can include optical fiber cables.

In the above system, the first and second cables can include electrical conductors.

The system can further comprise an external antenna configured to communicate with the lock body.

In the above system, the lock body can include a GPS receiver.

In the above system, the lock body can include a motion detector.

In the above system, the lock body can include a camera.

In the above system, the lock body can include an event recorder.

In the above system, the sensor can be less than 30 cm long.

In the above system, the centers of the latching hole and the fixed hole can be less than 20 cm apart.

In the above system, the centers of the latching hole and the fixed hole can be less than 10 cm apart.

In the above system, the object can be medicine.

Another aspect is a method of detecting tampering, comprising: attaching a lock shackle to a latch on a door of a container that includes the object; transmitting a first sensor signal through a sensor associated with the lock shackle, wherein the sensor has two opposing ends that are connected to a body of the lock.

The above method can further comprise: storing a first signature of the sensor; transmitting a second sensor signal used to generate a second signature sensor of the sensor; comparing the first signature and the second signature; and determining that the object has been tampered with if the first signature and second signature are different from each other.

The above method can further comprise: receiving a combination input at the lock which includes a combination lock; transmitting the combination input electrically to a server inside the lock or a remote server; comparing the combination input against a correct combination; and unlocking the lock if the combination input is the same as the correct combination.

BRIEF DESCRIPTION OF THE DRAWINGS

The nature, objects, and advantages of the described technology will become more apparent after considering the following detailed description in connection with the accompanying drawings, in which like reference numerals designate like parts throughout.

DETAILED DESCRIPTION

Figure 1:
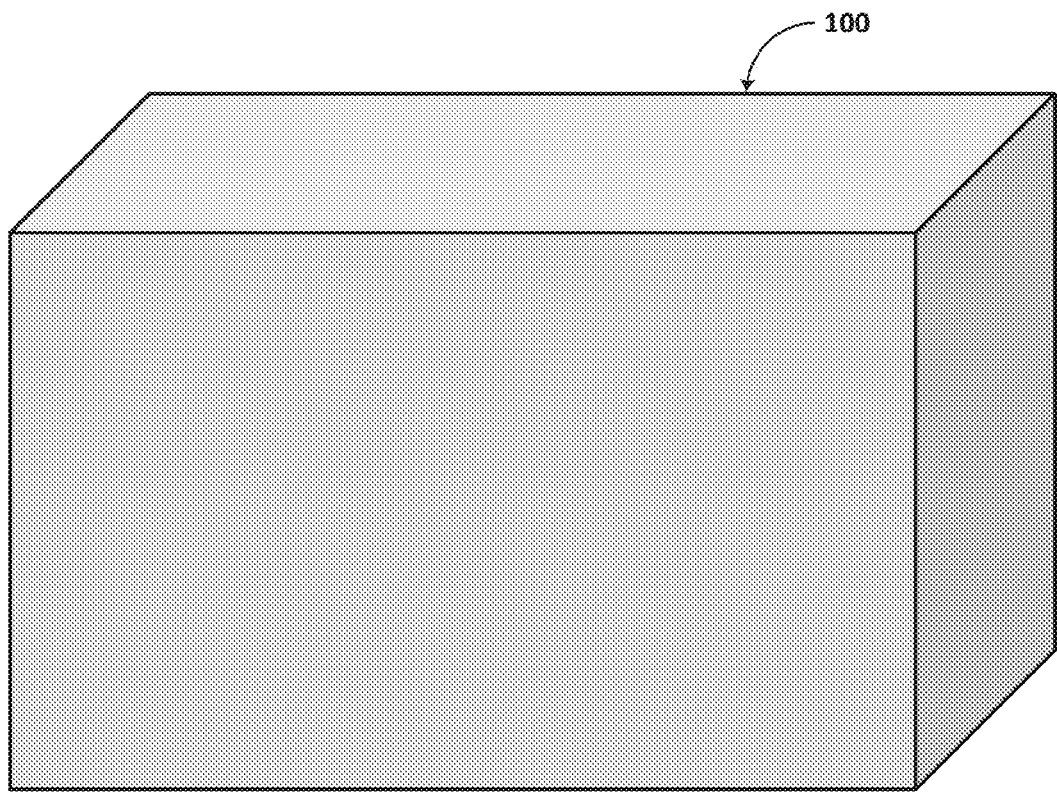
FIG. 1 shows a typical shipping container used to transport goods over sea and land.

As will be explained in further detail below, one aspect relates to a security system and sensor arrangement. One part of the security system may include a lock with electronic, wireless, and mechanical features which is sometimes referred to herein as an "eLockBox." One sensor can be a loop of an electrical conductor or a loop of an optical waveguide such as a fiber optic cable. Such a sensor can be attached physically to the eLockBox or placed remotely from the eLockBox and linked together via wireless connections using various bands of the electromagnetic spectrum. In some embodiments a sensor coupled to the eLockBox can be an arrangement of electrical conductors that cover the six sides of the interior of a container, which include the bottom, the top, the two sides, and end walls. Such a configuration may be referred to herein as an "Electrical Shield." In other embodiments a sensor can be an arrangement of optical waveguides such as fiber optic cables that cover the six sides of the interior of a container, which include the bottom, the top, the two sides, and end walls and which may be referred to herein as an "Optical Shield." Narratives in this disclosure pertaining to the Electrical Shield are also applicable to the Optical Shield. The Electrical Shield may be embedded in a medium such as nonwoven fabric, paper, cardboard, wood products, plastic sheets or foam, or other conformable, flexible media. The Electrical/Optical Shield may be formed as a loop of electrical conductor or a loop of fiber optic cable that is connected to electronic hardware used to detect disruption of the loop. The resulting combination of the continuous web of Electrical Shields or Optical Shields or Wireless Shields that, along with the conformable media, may blanket all of the container interior walls. The arrangement of this technology forms what is known as an Electrical Shield Wallpaper or conversely an Optical Shield Wallpaper, or conversely a Wireless Shield Wallpaper. In some implementations, the security system has a physical construction similar to a padlock with a body containing electronic hardware and a shackle comprising a sensor.

An objective of the described technology is to provide a security system to prevent tampering with any type of container such as a shipping box, a shipping case, and overseas shipping container, trucks, trains, storage units and perimeter security systems. The security system includes an electronic lock, the eLockBox, with a variety of sensors used to detect intrusions or potential intrusions and in turn inform a user of the status via a variety of wired and wireless communication systems. Furthermore, the described technology includes a suite of software embedded in the eLockBox and software resident in a cloud computing server. The software throughout the system is equipped with programs that secure the data with a set of cybersecurity programming measures used to prevent malicious intrusions over Bluetooth, Wi-Fi, Cell communications, wireless communications in general, wired communications, computer networks, cloud servers and the internet. The server contains a database that includes information regarding status, GPS location, history, tracking information of the containers, and other sensor readings of the system. The security system is equipped with sensors that provide information to the eLockBox. The primary sensor of the described technology includes a sensor loop that is connected to the eLockBox. This sensor can be a fiber optic loop or an electrical loop that encircles a container we are trying to protect and/or a fiber optic or electrical loop that is routed through the staple of a hasp and staple latch on a box or container in which unauthorized access needs to be prevented. The electronics in the eLockBox monitors the sensor(s) to make sure it is locked and an unauthorized intrusion will not occur. If an unauthorized intrusion or disruption of the loop in the sensor occurs, the eLockBox will inform the server. The server in turn will send an alarm or a warning whichever is appropriate to the owner of the container via mobile phone or e-mail or other notification mechanism. One particular sensor utilizes properties in Electrical Shields, which is a distributed set of conductors placed on the wall of a container. Upon a resistance measurement, the sensor provides a characteristic resistance value that is unique to a particular container and shield physical arrangement. This characteristic profile accounts for the shield overall electrical resistance value. For example, the shield can be manufactured by placing conductive ink on top of a material such as fabric or paper. Stripes of conductive ink are placed on the material such that the gap between the stripes is sufficiently narrow to prevent intrusion in to the container without damage to the shield or without an instantaneous change to the stripe resistance. The entire shield covering the container is connected so that it forms a 6-sided box shield with a beginning terminal and an ending terminal. The box shield may be continually or essentially continually monitored. It should be noted that any other characteristic response property of an Electrical Shield could be used to meet the objectives of the present described technology. For example, capacitance can be utilized in combination with a shield or wallpaper inside of the container. In this apptoach, one plate of the capacitor is formed in the wall paper arrangement covering the inside of the box or container, and the second plate of the capacitor can be part of the wall of the container. A change in one or both of the plates of the capacitor caused by an opening of the box by an intruder will cause a change in capacitance which can be detected and used as the means to sense tampering. In addition, an optical loop can be utilized as a sensor as is described in co-pending U.S. patent application Ser. No. 15/252,045.

Signal processing in the eLockBox may measure electrical parametric characteristics such as overall resistance, in a predetermined or random manner, may implement a mathematical algorithm to transform the measurement characteristics, and then encode the information for security purposes. The encoded information produced by the mathematical algorithm may be referred to herein as the Identity Code. The Identity Code may be based at least in part on characteristics of the shield. For example, a hash of measurement values may be used. The Identity Code may be encrypted.

The Identity Code along with the part number, date of manufacture, serial number, manufacturing location, part name, lot number, manufacturing line, test station, environmental conditions and physical characteristics constitute what is known as the Pedigree information. This set of data is securely stored in the cloud based database, making it virtually impossible for an eLockBox itself to be counterfeited. Each time the eLockBox checks in with the cloud based database, it must identify itself. If any parameter is different due to a malicious attack on the eLockBox, or an attempt to duplicate the eLockBox by counterfeit means, the identity comparator in the cloud based database will detect the difference. The response of the cloud based database is to send an alert of tampering to the designated person(s).

The sensors connected to the eLockBox use various parametric measurements that affect the electrical transmission properties of Electrical Shields. For example, if a sensor or an Electrical Shield is deliberately cracked in various areas, the cracks will cause an increase of electrical resistance to produce the necessary parameters used to obtain a unique Electrical Signature. One or more transmission characteristics from the Electrical Signature of the wall paper, can be selected by the proprietary digital signal processing program to generate the Identity Code. After the Identity Code is initially generated prior to shipment of the container, the Identity Code is embedded in the Pedigree and then sent to the server and/or embedded in an RFID tag. Any tampering of a package or a breach of the container wall will affect the Identity Code, and upon making a measurement, the system can compare the Identity Code received to the Identity Code measured and any difference exceeding a given threshold will reveal that intrusion has occurred, thus making the shipment suspect. Whether monitored real-time or on an event-driven basis, the Electrical Shield Wallpaper installed on a container's walls will detect a breach, and notification of a breach of the container can be immediately sent to a designated recipient. Immediate notification of a container breach enables rapid response by appropriate authorities who can potentially prevent or interrupt an unauthorized intrusion.

Accordingly, in one aspect of the described technology, a method of protection and detection of counterfeits for products involves taking a parametric measurement of an Electrical Shield embedded in a package or surrounding the product or blanketing the interior walls of any container. The measurement is taken at some time prior to shipment, for example at the product manufacturing facility and an Identity Code is obtained. The Identity Code may be encrypted and embedded in a Pedigree. The Pedigree is sent to a customer specified location in the supply chain over a communications channel. The receiver of the shipment of goods takes a similar measurement and verifies that the Identity Code is the same, which provides confidence that no tampering has occurred.

The Electrical Shield Wallpaper in the described technology utilizes different types of response properties of Electrical Shields. Depending upon which type of electrical material is used with the wall paper covering the container, for example, a conductive ink, conductive paint or other material can be used, each one with varying degrees of resistance such that upon a measurement of overall resistance will be different. Another characteristic is capacitance from the shield to the container itself which will vary depending on installation and type of shield materials used. It should be noted that any other characteristic response property of an Electrical Shield could be used to meet the objectives of the described technology.

In another aspect, an article of manufacture for the protection of products from counterfeits is disclosed. Hereafter this will be known as the Article. The Article may include the Electrical Shield as a continuous web or strip or other physical arrangement embedded in a medium such as non-woven fabric, paper, cardboard, wood products, plastic sheets or foam, or other conformable, flexible media. The resulting combination may be referred to herein as Electrical Shield Wallpaper. The Electrical Shield Wallpaper is used to line the walls of a container or package to cover all six sides. The beginning and end of the continuous electrical loop connects to an intelligent, autonomous detection unit called an eLockBox.

The eLockBox includes hardware and software required to monitor and report on the status of the sensors. Some of the functional elements in the eLockBox may include but is not limited to: GPS; RFID; humidity and temperature sensors, motion detector; camera; battery; Electrical measurement transceiver; communication channels for Internet, satellite, Bluetooth, and mobile; software, algorithms, and firmware for signal processing and encryption of communications.

The word "exemplary" is used exclusively herein to mean "serving as an example, instance, or illustration." The embodiment described herein as "exemplary" is not necessarily to be construed as preferred or advantageous over other embodiments.

In some embodiments, a process for tamper proof security of a shipping container is provided. A package with an Electrical Shield and a process including a test system and digital signal processing software allows a shipping container to be protected on all of its sides. Although illustrations and discussions are directed to a shipping container, similar approaches will apply for other containers such as with a semi-truck, fixed storage container, train cars, secure warehouse or other type of storage that needs to be protected against unauthorized access or tampering.

FIG. 1 illustrates a typical shipping container 100, showing that it has six sides that need to be protected, any of which are vulnerable to unwanted intrusion. A container as described herein can be any size or shape, and moved by any of the typical shipping methods used today, which is by air, land or sea.

Figure 2:
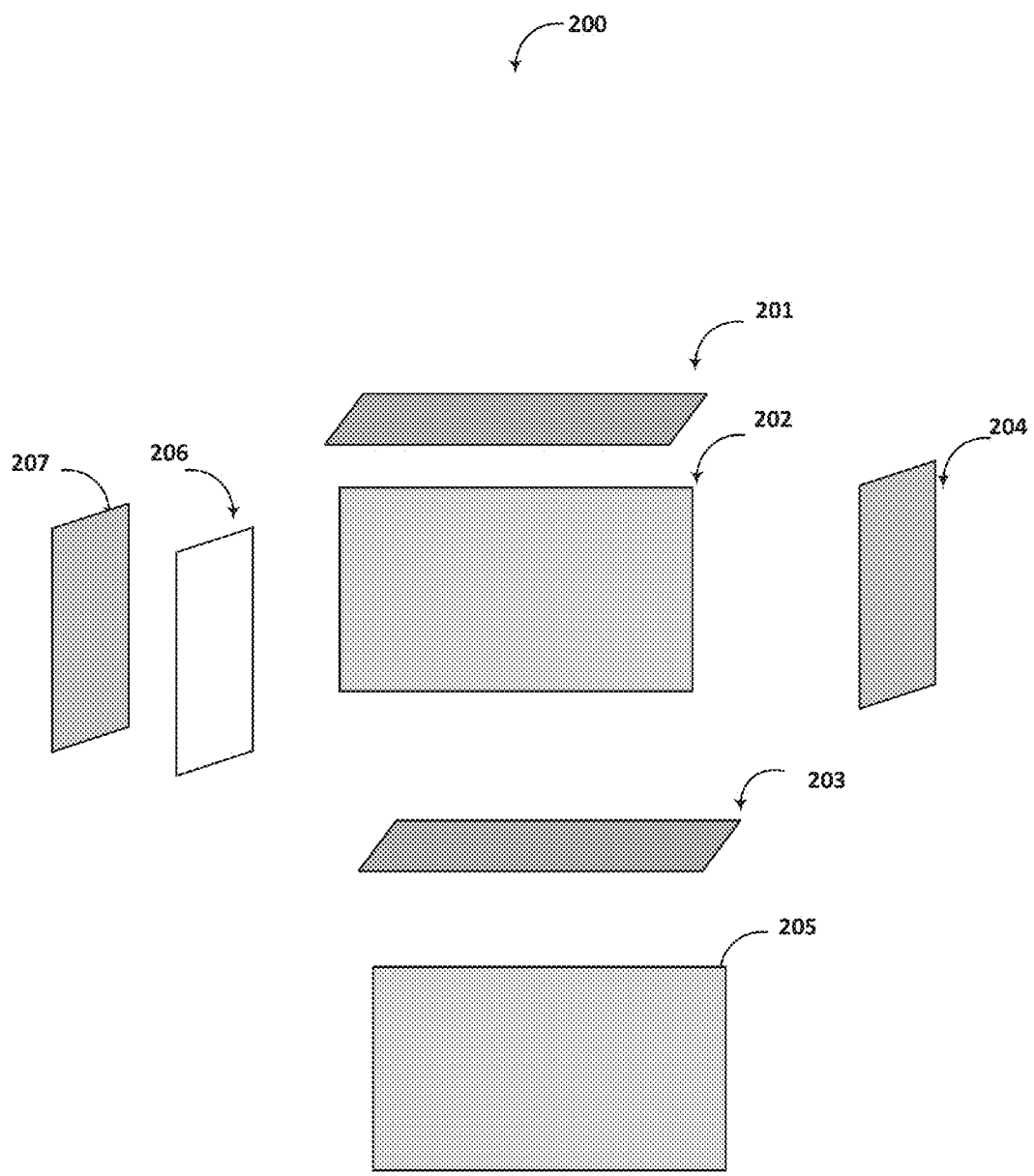
FIG. 2 shows a breakdown of the different sides of a typical shipping container used to transport goods over sea and land.

FIG. 2 shows a breakdown of all of the sides of a shipping container 200. The sides are the top side 201, the bottom side 203, the left side 202, the right side 205, the back side 204 and the front 207. An overlapping flap 206 is shown where additional Electrical or Optical Shield Wallpaper (or shield) is placed in order to protect the entrance to the container.

Figure 3:
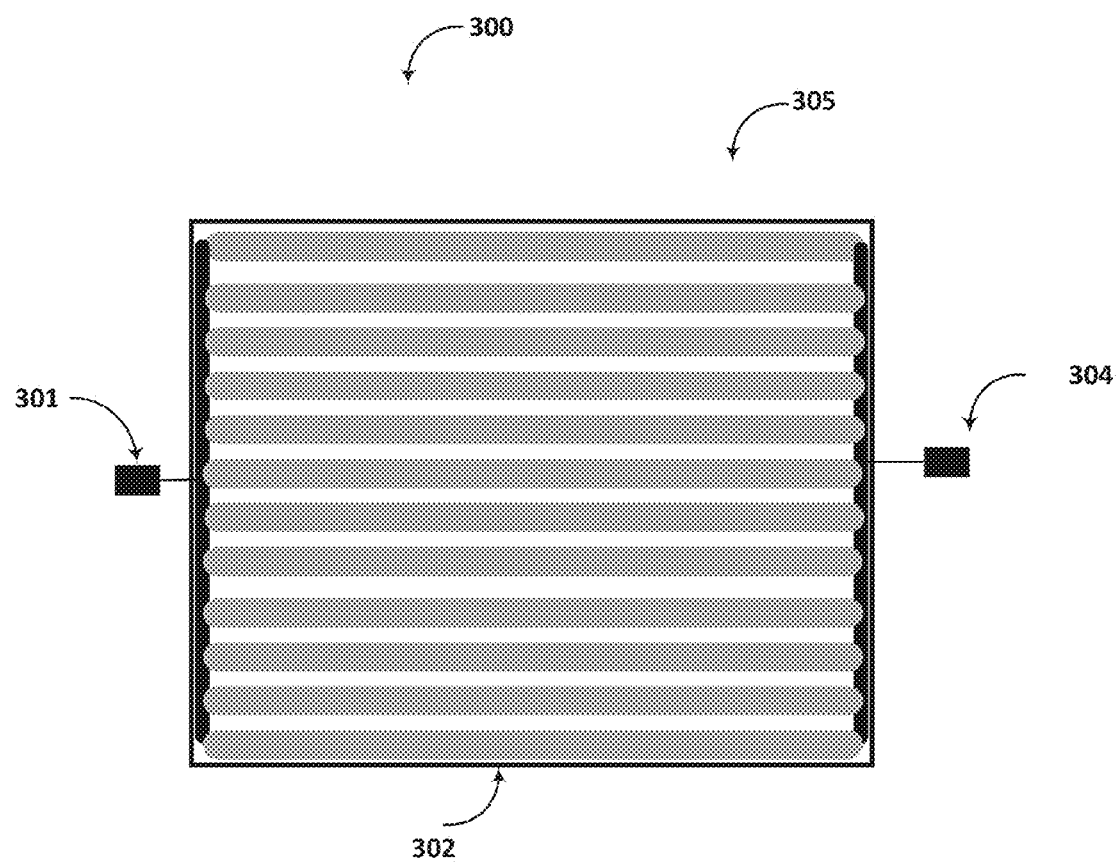
FIG. 3 shows an embodiment of how the Electrical Shield Wallpaper can be constructed.

In FIG. 3, an Electrical Shield Wallpaper 300 is shown which is used to protect the container. The Electrical Shield Wallpaper 300 includes a flexible and conformable media 305, over which a suitable Electrical Shield 302 may be applied or embedded and fixed in place. The material can be paper, plastic, cloth, nonwoven material, wood product or any other conformable material that can accept the Electrical Shield. The Electrical Shield can be glued to the backing material or embedded into the material when it is manufactured. Alternatively, it is possible to place the conductive material between two layers of the backing material as in a sandwich arrangement. The Electrical Shield 302 is routed in a way to form a stripes or a grid which can be rectilinear or any manner of random arrangement such that it does not allow penetration of a person, hands or arms or tools or the removal of goods from the container without disrupting the Electrical Shield arrangement. In FIG. 3, it shows one possible arrangement for the Electrical Shield where stripes are placed in a horizontal pattern. One side of the shield is shorted and connected to an input electrical connector 301 and the opposite side of the shield is also shorted and connected to an output electrical connector 304. The electrical connectors can meet different standards such COAX, a typical wire or SMA, or some other configuration or standard, or can be a customized connector. The Electrical Shield Wallpaper 300 may contain a layer of adhesive to facilitate binding the Electrical Shield Wallpaper 300 to the sides of the container.

Figure 4:
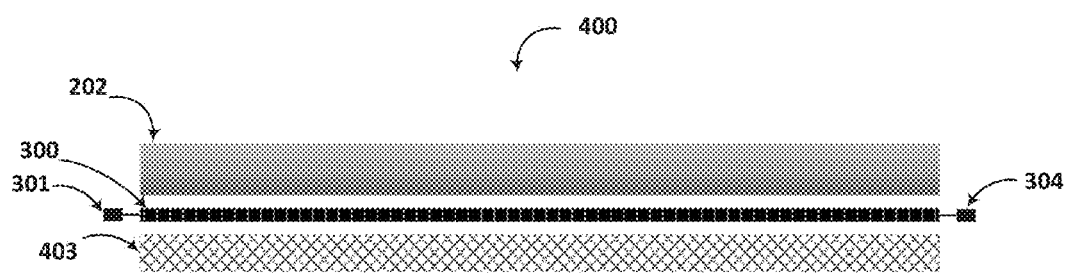
FIG. 4 is an embodiment of the Electrical Shield Wallpaper as applied to one surface of a container.

In FIG. 4, one side of the container is shown. An Electrical Shield Wallpaper 300 can be applied to one of the six sides of the container to form a panel. In this case we show an example of how to apply the Electrical Shield Wallpaper to the left side 202 of the container. The Electrical Shield Wallpaper 300 is applied to the wall of the container by using attachment pins or by using adhesive to apply it like standard wallpaper on a wall. The Electrical Shield Wallpaper 300 can be protected from damage by an additional protection layer of material 403 which can be made out of wood, plastic, metal or some other protective material and attached to the side wall 202 of the container. Various other configurations of the Electrical Shield Wallpaper, how it is applied to the side wall of the container, the density of grid, and other arrangements can be utilized in order to implement the described technology. Connectors 301 and 304 are able to connect the panel with the Electrical Shield Wallpaper 300 to additional panels to provide complete wall coverage of all six sides of the container.

Figure 5:
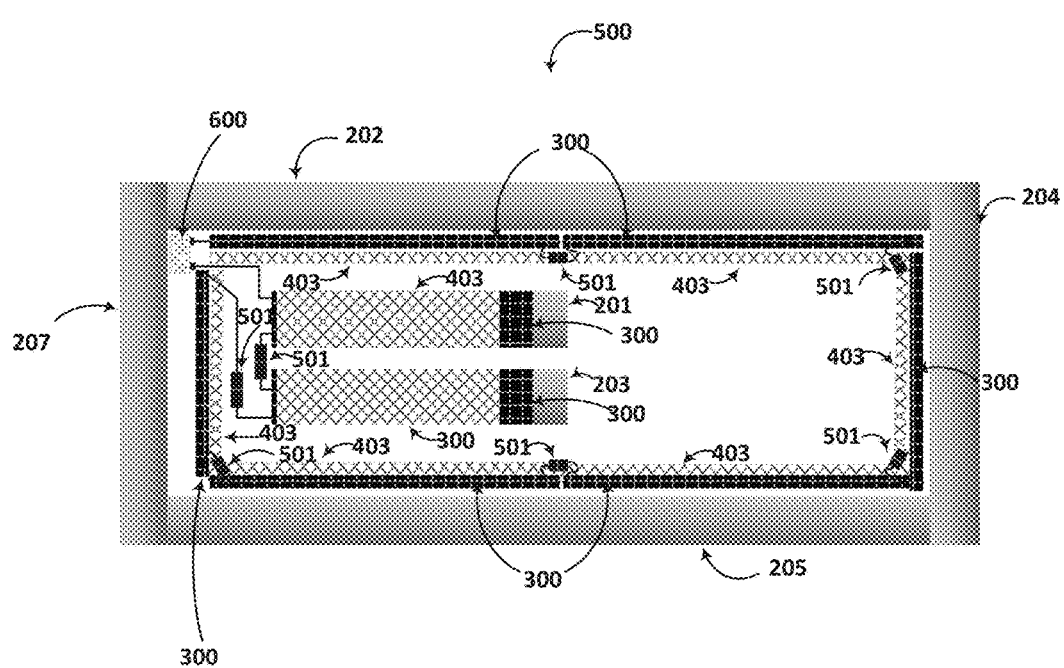
FIG. 5 shows how different Electrical Shield Wallpaper panels can be applied to all interior surfaces of a container.

In FIG. 5, an arrangement used to protect the sides 202, 204, 205, and 206, the ceiling 201, and the floor 203 of a container 500 to prevent tampering is shown. A portion of the ceiling 201 and the floor 203 with their Electrical Shield Wallpaper 300 and their respective protection layer or material 403 are shown for illustration purposes. Several panels of The Electrical Shield Wallpaper 300 are shown attached to the sides 202, 204, 205 and 206 of the container 500. In this case, there are six panels that include the Electrical Shield Wallpaper 300. The Electrical Shield Wallpaper 300 in each of the panels is connected to an adjacent panel as shown in connection points 501 using connectors 301 on one side of the shield and connectors 304 at the opposite side of the shield corresponding to each Electrical Shield Wallpaper 300. As shown in the illustration, the Electrical Shield Wallpaper 300 in the panels forms a continuous circuit so an electrical or optical signal is sent into connector 301 of a given panel will pass through the conductive stripes of the panel and an output signal will come out of connector 304. In the same manner, using connectors 301 and 304, the panels can be attached to the ceiling 201 and on the floor 203 of the container 500. This arrangement will thus form a complete continuous loop of Electrical Shield Wallpaper 300 in an arrangement that will cover the six interior walls of the container. The Electrical Shield Wallpaper panels can overlap so that there are no gaps in the coverage of the sides of the container 500. The Electrical Shield Wallpaper 300 on the door side 206 shows the addition of the protective layer 403. In this case the Electrical Shield Wallpaper 300 can be adhered to the protective layer 403. The entire loop of electrical material of conductive ink covering all six sides terminates in two connectors which are attached to the eLockBox 600, which is described in detail below. Once the eLockBox 600 is connected to connectors 301, 304 for the beginning and the end of the shield loop respectively, the doors of the container 500 can be closed and the container 500 will be secured. Although the eLockBox 600 is shown to be inside the walls of the container 500 in FIG. 5, the eLockBox 600 can be placed outside the container 500, for example, on the latch of a door of the container 500.

Figure 6:
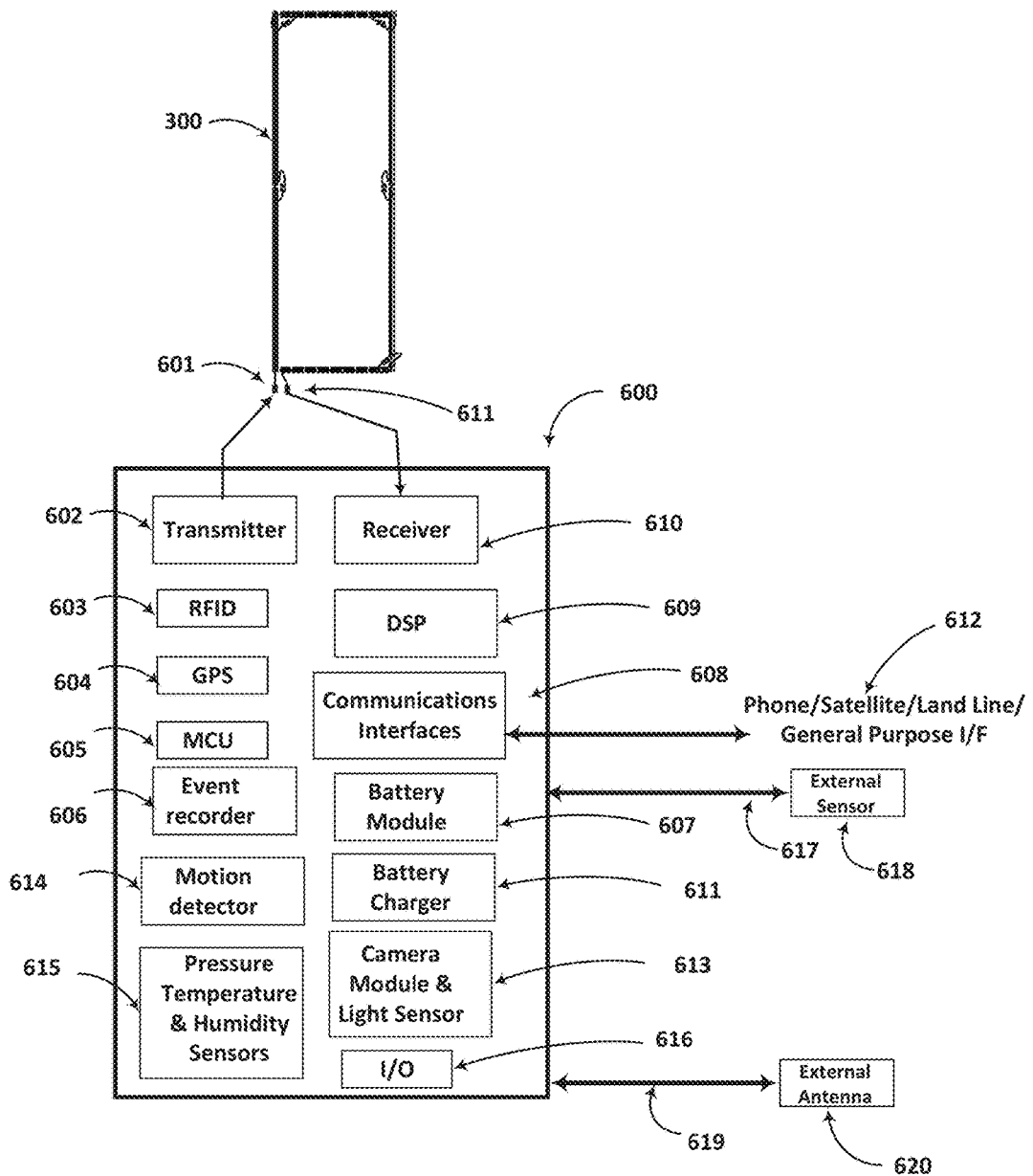
FIG. 6 illustrates how the continuous loop of Electrical Shield Wallpaper connects to the eLockBox.

In FIG. 6, an eLockBox 600 is shown with one type of sensor, and in this case, the sensor is an Electrical Shield Wallpaper 300. However, the sensor or another sensor may be placed on the latch of a door (as will be described later) so that the door of the container can be monitored. In some embodiments, both types of sensors can be employed in which one type of sensor (e.g., the Electrical Shield Wallpaper 300) is placed around the container, and another sensor is placed on the door.

The Electrical Shield Wallpaper 300 can be used to protect the container from tampering and to notify shippers and owners of the goods, about potential intrusions. In this case, FIG. 5 shows a top view of the sides of the container 500. However, depending on embodiments, the Electrical Shield Wallpaper 300 can be placed in all sides of the container 500. Note that in this illustration, the eLockBox 600 is not drawn to scale relative to the sides of the container including the Electrical Shield Wallpaper 300. This was done to illustrate the details and functionality of the eLockBox 600.

The eLockBox 600 can include a housing that contains electronic hardware and software used to detect intrusions into the container and may also notify the owner or operator of the container of the intrusion. This can be done in real time, meaning measurements and/or notifications can be made continuously or periodically during transit of the container. Also, the eLockBox 600 may monitor environmental conditions as needed to protect the integrity of the material in the container. In FIG. 6, the eLockBox 600 includes: a Transmitter 602 for the electrical or optical sensor loop; an RFID tag 603, a GPS locator 604; a microcontroller or MCU 605; an event recorder 606; a camera module, 613, which can be used to identify intruders and physical location; pressure, temperature and humidity sensors 615 which can be used to monitor the environmental conditions and can be used to protect the integrity of the product in the shipping container; a motion detector 614 such as an accelerometer or inertial measurement unit (IMU) to be used as a turn on and turn off device for the eLockBox 600, or to awaken the system from battery savings mode, or for the analysis of the motion frequency spectrum, which may be used to determine the exposure to shock of the material in the container or the movement of the container at a given location, or attempts to break or damage the eLockBox, or detect vibrations caused by attempts to breach the container; a battery module 607; a battery charger 611; a set of communications interface hardware 608; a digital signal processor (DSP) 609; a receiver module 610 for the electrical or the optical sensor loop; and an input/output (I/O) interface 616 used for communications and to charge the eLockBox 600.

The I/O interface 616 can be a USB standard I/O or another computer type of I/O. The communications interfaces 612 can be one of the communication interfaces used in industry such as but not limited to Wi-Fi, mobile cell communications, Bluetooth, Ethernet, Radio, ZigBee or other communication standard. There can be additional external devices that are connected to the eLockBox 600 as will be described later. One or more external sensors 618 may be connected to the eLockBox 600. These sensors can be optical, acoustic, infrared or other types of light sensors. These sensors may connect using a sensor interface 617 that may be wireless or wired using a cable. The sensors 618 can be attached to other containers or other parts of the same container as the eLockBox 600.

The eLockBox 600 may connect to one or more external antennas that can be placed inside or outside of the container that is protected by the eLockBox 600 using a transmission line 619. The eLockBox 600 connects to the Electrical Shield Wallpaper 300 surrounding the container at location 601 where transmitter 602 in the eLockBox 600 generates an electrical signal which is injected into the Electrical Shield Wallpaper 300. The electrical signal in the transmitter 602 may be from a DC voltage source, an AC voltage source a pulse generator, or other suitable electrical stimulus generator. In embodiments that use an Optical Shield Wallpaper, the transmitter generates an optical signal from a laser, an LED or other type of optical signal generator. In this case, the electrical signal circulates in the loop of the Electrical Shield Wallpaper 300 and is received at connector 611 and detected by the receiver 610. The receiver 610 can include the necessary detection and measurement circuits to determine any tampering in real-time. Any attempts to tamper or intrude into the container will be sensed by a change of characteristics such as but not limited to resistance or capacitance.

Suitable conductive ink is commercially available, such as manufactured by Dupont. In the arrangement of FIG. 3, the resistance of each stripe will be in parallel with the resistance of the other strips in the panel. For example, if in the specific panel shown in the FIG. 3, if each strip is 1 kilo ohm, since there are 12 strips, the total resistance will be ¹⁄₁₂ or 83 ohms. The resistance for a series of six sides may be on the order of a few hundred to a few thousand ohms depending on the conductivity and strip pattern of the conductive ink. This quantity can be measured by typical ohmmeters as well as a change caused by an intrusion. The ohmmeter can be incorporated in the Receiver 610. For example, the receiver input may be fed to the input of a current to voltage converter to measure the current generated by a known amplitude voltage signal output by the transmitter 602.

The eLockBox 600 may contain an RFID tag 603 and a GPS locator 604. The Microcontroller or processor MCU 605 includes embedded software used to manage operations, to host a control system that controls the components inside the eLockBox 600, and to provide the eLockBox 600 with protection against a cyber intrusion.

An event recorder 606 can be set to monitor the Electrical Shield Wallpaper 300 to ensure the loop is not affected by breaking or by changing its signature characteristic. The event recorder 606 can also be set to periodically monitor the Electrical Shield Wallpaper 300, or to record an event at the time the event occurs (real time). The event recorder 606 is used to store the monitoring history of the information generated by the eLockBox 600, its general operation and any access of the container during a given period of time.

A battery module 607 can power the eLockBox 600 during the period of time when the container is protected. Typically the period of time can be extended by providing a sufficient amount of battery energy stored. The eLockBox 600 also includes the battery charger 611 used to condition the power coming in from an external power source such as the I/O interface 616, which can be compliant with standard USB protocol which has the capability to deliver power to battery operated hardware such as the eLockBox 600.

A digital signal processor 609 is used to carry out multiple operations related to the generation of an electrical signature for the Electrical Shield Wallpaper 300 as well as execution of mathematical models and statistical models. The digital signal processor 609 can also be implemented in software executed in the MCU 605.

Another module in the eLockBox 600 is the communications interface hardware 608 which supports the communications interfaces 612. This is used to communicate the status of the container to the user in a near or remote location. Some of the communication interfaces 612 can be to a mobile phone via short distance wireless, to a cellular tower or an RF receiving tower, a land line, satellite, fiber optics cable and other types of communication channels. There are several ways used in the described technology used to prevent the deliberate isolation of the container for the purpose of keeping it from notifying the user that tampering is occurring. In some embodiments, the user system in a remote server can query the eLockBox 600 on a periodic basis to detect status. In some other embodiments, a nonmetallic window such as glass in a given area of the container can be used to place a satellite antenna on the inside of the container to broadcast any tampering occurring in real time or in an event driven mode. The non-metallic window can be protected from disturbance by a panel of Electrical Shield Wallpaper 300, which in this case is made with a material that will not block RF frequencies coming out of the antenna. The antenna is therefore not prevented from transmitting at any time. Both methods can be used at the same time for greater communication and security assurance.

Figure 7:
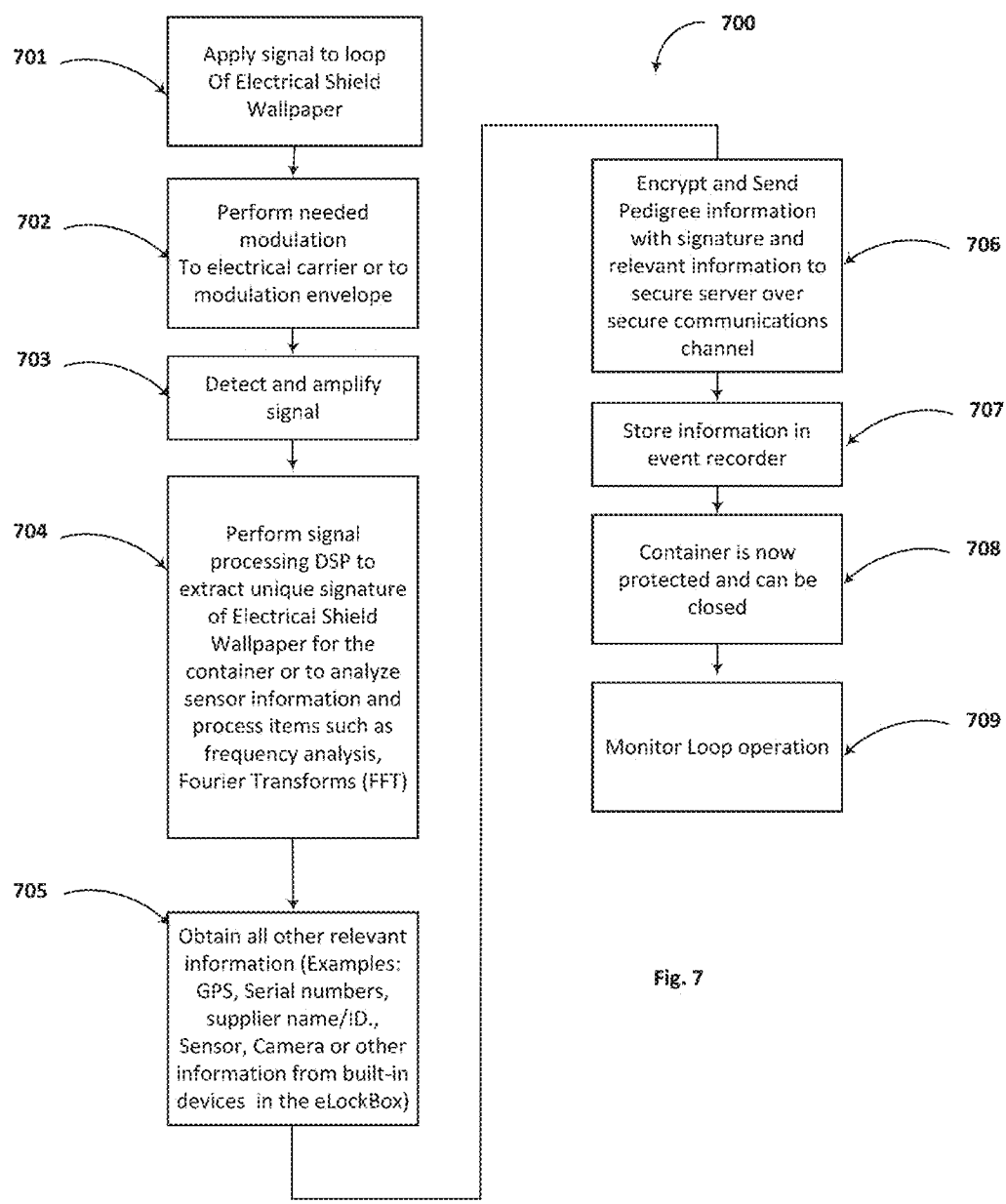
FIG. 7 is an embodiment of the process used to characterize the container secured with the Electrical Shield Wallpaper using the eLockBox.

In FIG. 7, process 700 is executed in the eLockBox 600 used to acquire a signature for the Electrical Shield Wallpaper 300. In the first step 701, a signal is applied to the electrical loop in the Electrical Shield Wallpaper 300. In a second step 702, a modulation of the Electrical carrier frequency (or wavelength) signal in the Electrical domain is conducted and a modulation signal envelope used to modulate the Electrical carrier is applied. The modulation envelope may apply AM, FM or any other type of modulation. The carrier may be modulated also by changing the frequency (wavelength) of the power source. Both time and frequency modulation can be done in the electrical domain and in the electrical domain one at a time or by a simultaneous time and frequency modulation. In step 703, the electrical signal is detected after it circulates through the loop. The electrical signal can be digitized. In step 704, a digital signal processing algorithm is performed to extract a signature. This can be done by a detection of characteristics such as resistance, or capacitance, reflection or other electrical effect characteristic of the shield section that is being used. Other relevant information produced by the various elements of the eLockBox 600 is collected in step 705 such as GPS location, RFID information, event recorder information, etc. In this step, all needed sensor information is shown but not limited to the ones in FIG. 7. For example, a digital signal processing (DSP) algorithm can be implemented to determine the frequency spectrum of the signals sensed by the motion detector 614 for the purpose of determining if the packaged goods in the container could have become damaged during shipment. A Fast Fourier Transform (FFT) can provide some of this information. Motion detector information can be used to wake up the processor in the eLockBox 600 from a power savings mode of operation used to save battery power or to anticipate if an intruder is attempting to tamper with the lock. The information is then encrypted and sent in step 706 to a secure server over a secure communications channel. In addition, various electrical modules can be used to insert electrical attenuation and distortion and can be arbitrarily used by placing them in between connection points 501 to further randomize the signature to make it robust, resisting efforts to counterfeit the signal. The same information sent to the secure server is stored in the event recorder in step 707. In step 708 the doors of the container can be closed. In step 709 the system goes into a mode where the loop is operated and monitored continuously, or periodically, or with event driven monitoring or a combination of one or more of these.

Figure 8:
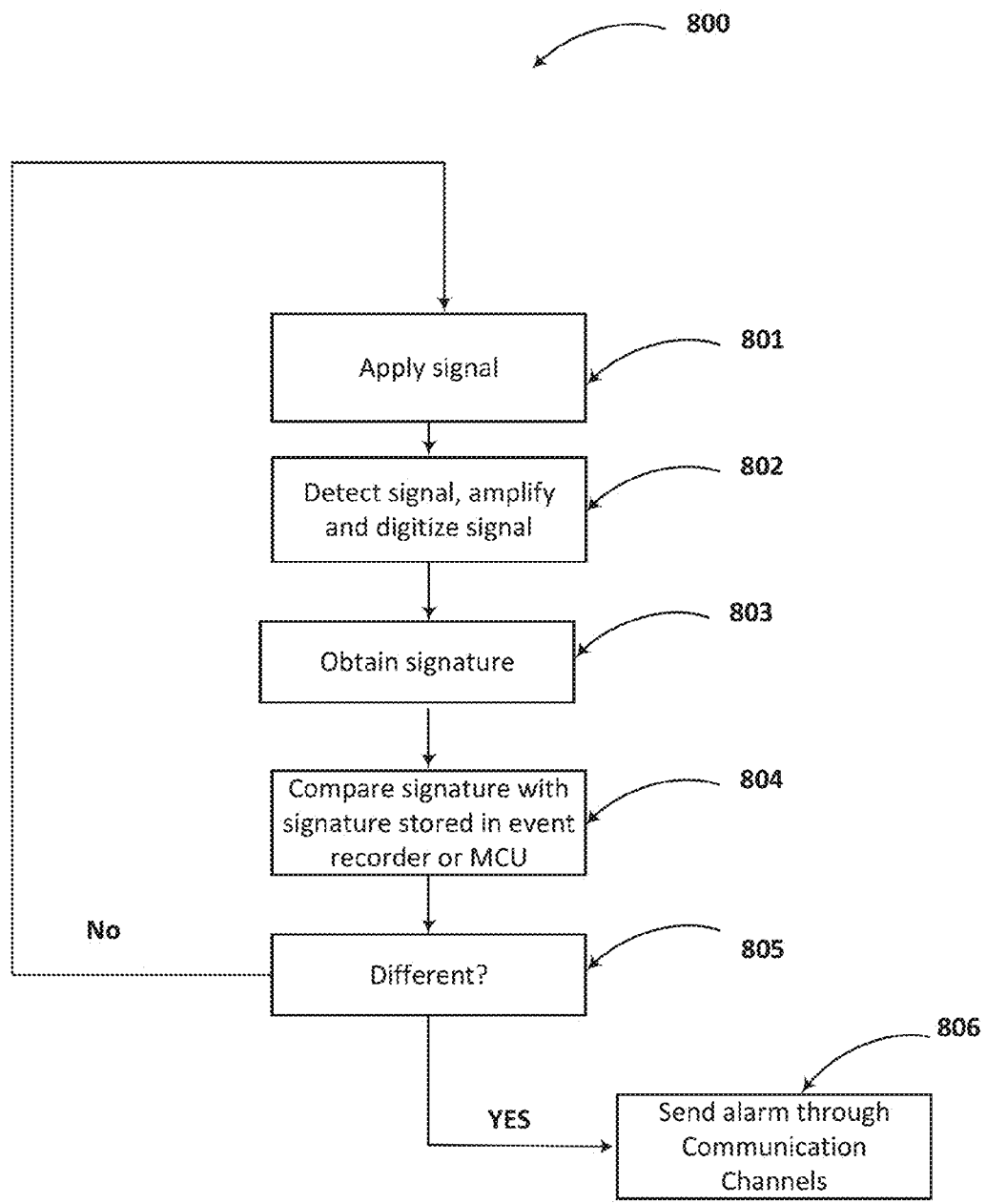
FIG. 8 illustrates the monitor loop operation process used to protect the container from intrusions.

In FIG. 8, a process 800 shows a process executed in the eLockBox 600 used to monitor the container security. In step 801, an electrical signal is applied to the loop including the Electrical Shield Wallpaper 300. In step 802, the electrical signal coming out of the loop is detected, amplified and digitized. In step 803, the signature of the loop is obtained. In step 804, the obtained signature is compared with the signature obtained when the container was first closed and stored in the event recorder. In step 805, it is determined whether the signal is different or the same based on the comparison. If the signature comparison is the same between the two measurements, the loop is initialized again to continue in the monitor mode. If the comparison is different, at step 806 an alarm is sent to the server using one of the available communication channels. Note that in the described technology, more than one communication channel may be used to notify the server about tampering for redundancy and to prevent an intruder from cutting off real-time communication with the server. Also the continuous monitoring loop can be adapted so it executes at a programmable intervals of time in order to save battery power. Another way to save battery power is to monitor and notify based on events, such as an intrusion, container relocation, or unauthorized opening of the container doors.

Figure 9:
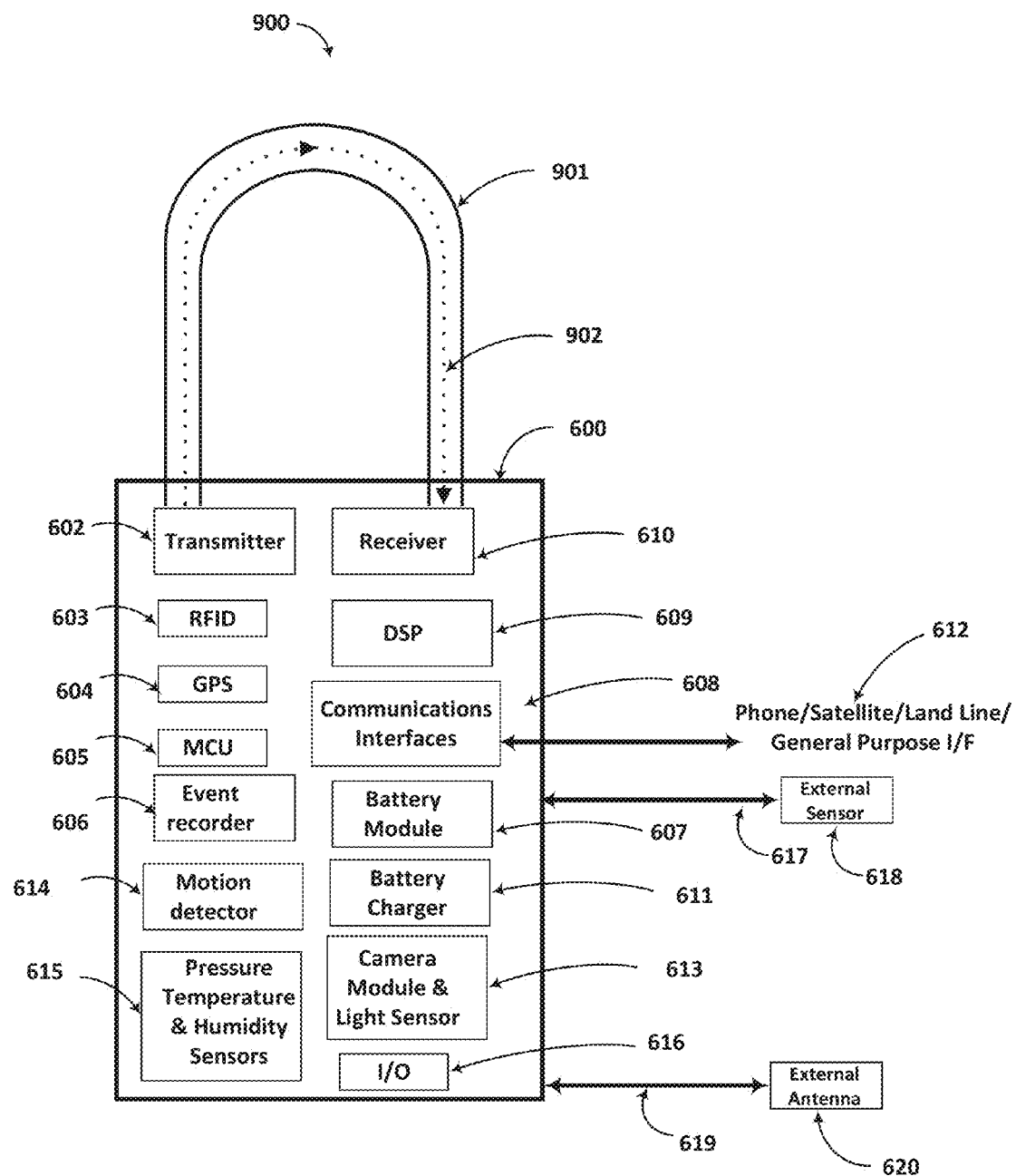
FIG. 9 illustrates an embodiment of a system where the eLockBox uses a sensor to monitor the closed state of a container using a fiber optic waveguide loop.

In FIG. 9, system 900 includes an embodiment of the anti-tampering system that uses an eLockBox 600 with a sensor including an optical waveguide loop 901. The optical waveguide loop 901 can have a tubular structure the inside being hollow so that it can host a waveguide 902. In this case, the waveguide loop 901 can be flexible and can secure the handle of the door where the eLockBox 600 is placed in a manner similar to a padlock. The waveguide 902 can be made with an optical fiber and it can be used to prevent cutting of the optical waveguide loop 901. In the simplest case, cutting of the loop 901 can be detected by sensing the absence of a signal at the receiver. In addition, the arrangement in this embodiment allows the system to obtain a signature from the waveguide 902. If the waveguide is made with a fiber optic, the system 900 may obtain a signature of the combination of the waveguide 902, the transmitter 602 and the receiver 610. The signature can include one of the many optical properties such as discussed in U.S. Pat. No. 9,329,098 B2, hereby incorporated by reference in its entirety. A counterfeiter will not be able to cut or replace the waveguide 902 since the signature cannot be reproduced from one piece of optical fiber to another due to the unique signature of each piece of fiber optic cable. The eLockBox 600 monitors the optical loop 902 for disruption or cutting and transmits the intrusion or tampering to the server.

Figure 10:
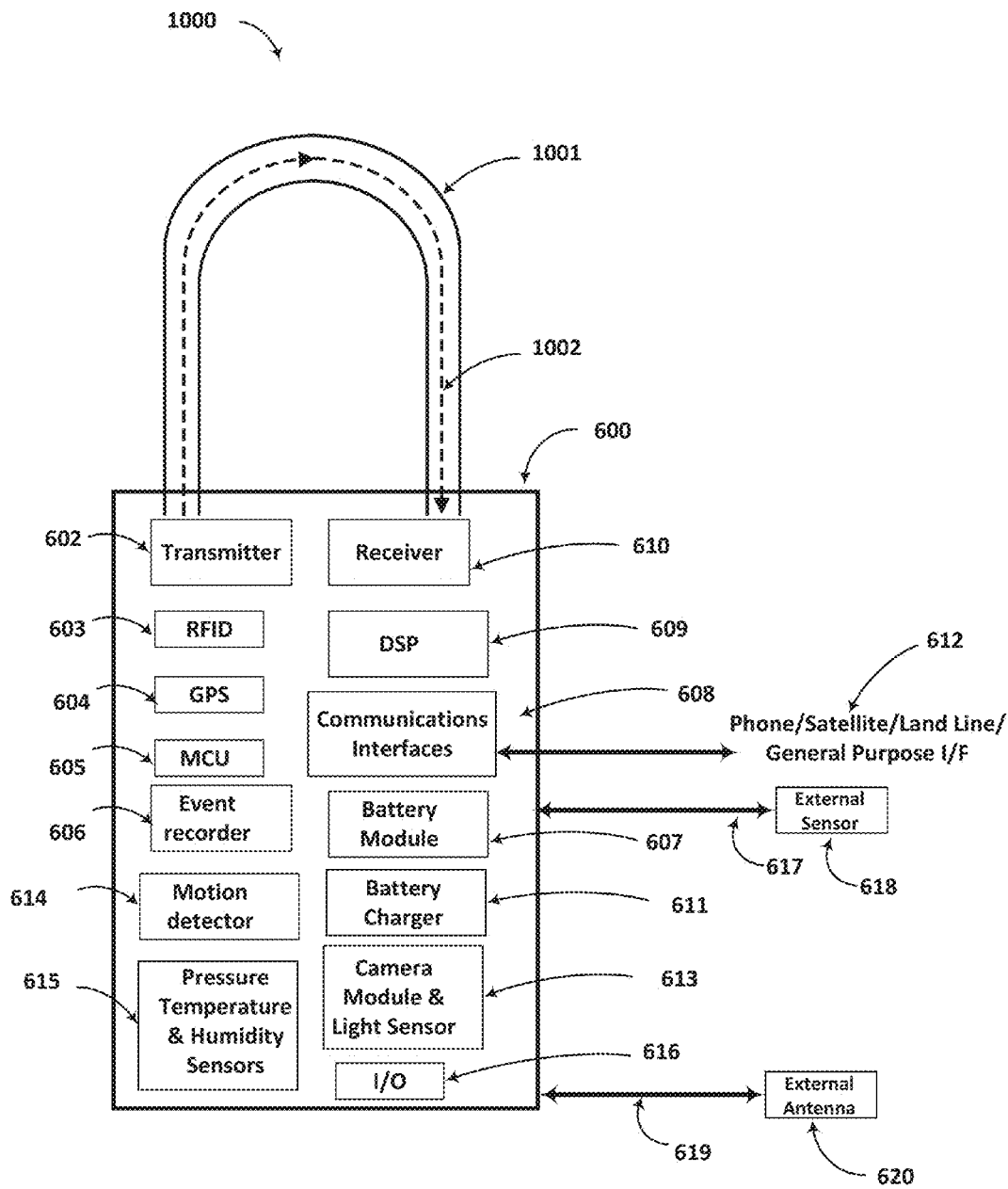
FIG. 10 illustrates an embodiment of a system where the eLockBox uses a sensor to monitor the closed state of a container with the use of an electrical conductor.

In the system 1000 of FIG. 10, the sensor connected to the eLockBox 600 includes a conductor 1002 such as an insulated wire, which is embedded inside of a metal loop 1001. The metal loop 1001 can be made with hard grade steel to prevent cutting. In this case, the eLockBox 600 monitors the conduction of electrical current to determine any permanent or temporary disruption of the current flowing through the sensor loop. The sensor loop can be implemented with other approaches such as using an acoustic wave circulating around the loop 901 or an RF signal loop circulating around loop 901.

Figure 11:
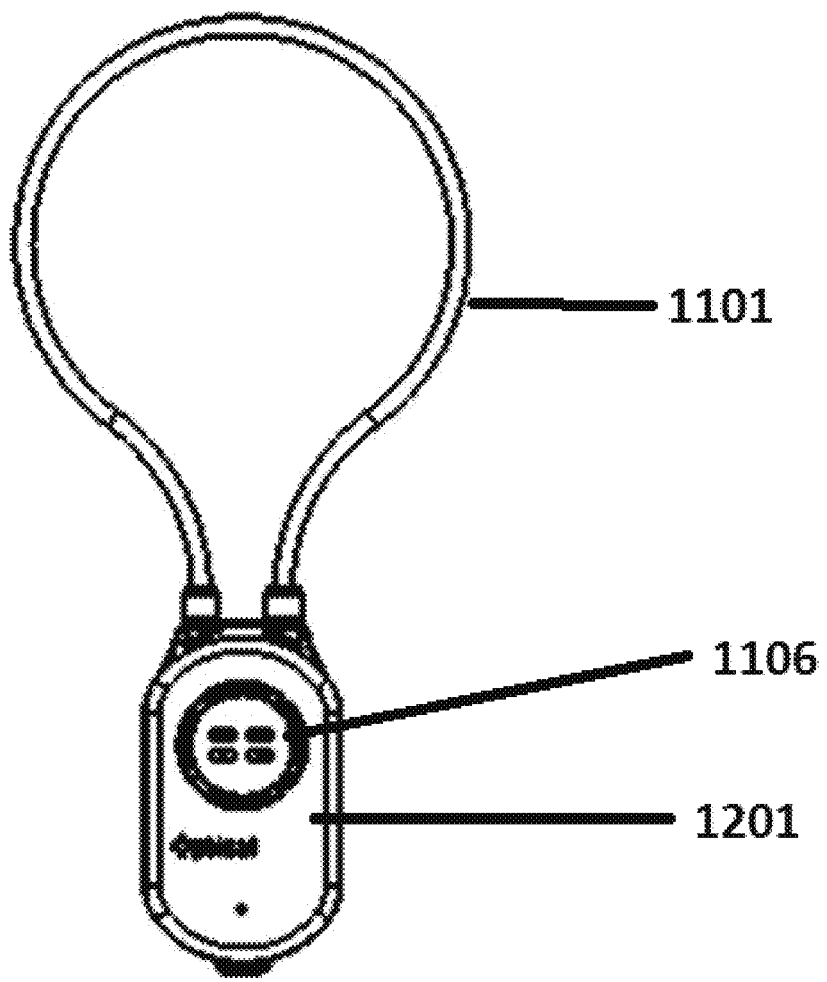
FIG. 11 shows a system including the sensor and the eLockBox.

FIG. 11 shows a protection system including the sensor and the eLockBox 600. This system includes a loop sensor 1101 configured as a shackle of a padlock, where the eLockBox 600 is analogous to the body of a padlock. Also similar to a padlock, and as described in detail below, one end of the loop sensor 1101 can be removed from the eLockBox 600 to thread the loop sensor 1101 through the opening of the staple of a hasp and staple style latch and then re-inserted and secured into the eLockBox in a manner similar to a conventional padlock. The loop sensor may be less than 30 cm long, less than 20 cm long, or in some implementations less than 10 cm long. Subsequently, during transit, the eLockBox can check that continuity of the wire or optical fiber connection is maintained from the transmitter 602 to the receiver 610. If a break or removal is detected because the signal at the receiver is lost, a notification can be sent to the system user as described above.

The embodiment of the eLockBox 600 shown in FIG. 11 includes a front cover 1201 which mounts a 4-digit combination lock 1106. The number of digits used for the combination can be more or less than 4. As will be explained further below, when the correct combination is entered, the lock 1106 can be rotated by hand to move a latch inside the eLockBox that releases one side of the loop sensor 1101 for removal of the loop sensor 1101 from the latch so the door can be opened. Combination locks of this type are commercially available from, for example FJM Security Products of Lynnwood Wash. as their Combi-Cam product line. Furthermore, the combination lock can be replaced with any known system of security such as fingerprint scanner, security eye scanner, etc.

Figure 12:
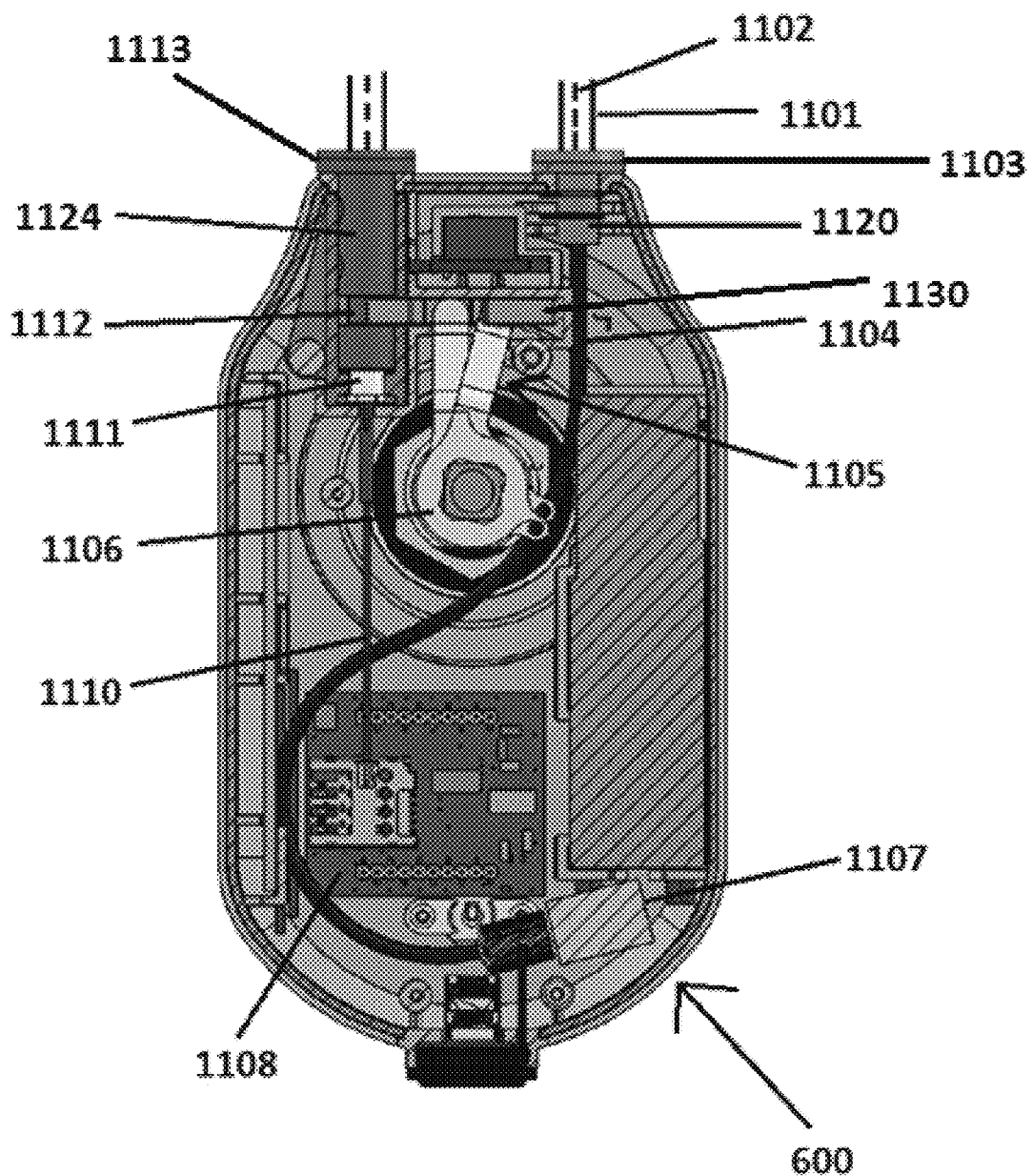
FIG. 12 shows a detailed drawing of an embodiment of the system.

FIG. 12 shows internal components of one embodiment of an eLockBox as in FIG. 11 viewed from the back with the rear cover removed. In this embodiment, the system includes the sensor loop 1101 forming a shackle with an internal fiber cable 1102, and a lock body implemented as an eLockBox 600. The shackle 1101 can be the tubular loop that was described for the loop 901 of FIG. 9 or loop 1001 of FIG. 10. The eLockBox 600 may include two shackle holes 1103 and 1113 where two opposing ends of the shackle are attached, an internal segment of the fiber optic cable 1104, a latching mechanism 1105, a combination lock 1106, an optical receiver sensor 1107, driver printed circuit assembly (PCA) 1108, LED cable 1110, transmitter 1111, and latch 1112.

The holes 1103 and 1113 can include a fixed hole 1103 and a latching hole 1113. The distance between the centers of the two holes 1103 and 1113 may be less than 20 cm, or less than 10 cm to make the device capable of being held in one hand. The shackle 1101 may be essentially solidly and permanently installed into the fixed hole 1103. The fiber optic cable 1104 extends from the fitting 1120 installed in the fixed hole 1103. The end of the shackle 1101 that is inserted into the fixed hole 1103 cannot be removed from the fixed hole 1103 in normal use. The other end of the shackle 1101 including fitting 1124 is inserted into the latching hole 1113. The fitting 1124 includes a groove 1112 that is engaged with a slider 1130 when the eLockBox 600 is locked. When a user inserts the correct combination in the combination lock 1106, the latch 1112 unlatches the shackle 1101. Then, the shackle 1101 can be taken out of the latching hole 1113. When the shackle 1101 is removed from the latching hole 1101, the shackle 1101 may in some implementations rotate about an axis that is parallel to the two long ends of the shackle 1101.

The combination lock 1106 can be a 4-digit combination lock which provides 10,000 different combinations. However, embodiments are not limited thereto and can include more (e.g., 5 digits, which provides 100,000 combinations) or fewer digits (e.g., 3 digits, which provides 1,000 combinations). The number of digits can vary depending on the user preference. In some embodiments, the combination input can be sent electrically to a server inside the eLockBox or a remote server for comparison against the correct combination.

When the correct combination is input and the front knob is rotated, an arm 1105 that is also engaged with the slider 1130 rotates to move the slider 1112 out of the groove 1112 so as to unlatch the fitting 1124 and thus the shackle 1101. The fitting 1124 may then be pulled away from the transmitter 1111 and out of the hole 1113.

A driver PCA 1108 can include the hardware and software components to operate the eLockBox 600. For example, the eLockBox 600 can include the various components required to operate the RFID 603, GPS 604, MCU 605, event recorder 606, motion detector 614, sensors 615, DSP 609, communications interface hardware 608, battery module 607, battery charger 611, camera module and light sensor 613, and I/O interface 616.

The driver PCA 1108 can also include an LED driver (not shown) to transmit a transmit signal to the fiber optic transmitter 1111 via the cable 1110. When the transmit signal is received by the fiber optic transmitter 1111, a sensor signal (e.g., light pulse, electrical signal, etc.) suitable for transfer through the fiber cable 1102 can be transmitted from the fiber optic transmitter 1111. During normal operation, the sensor signal is transmitted through one end of the fiber cable 1102 and through the shackle 1101 and ultimately received at the other end of the shackle 1101 inserted in the fixed hole 1103. Then, the sensor signal is transferred through the fiber optic cable 1104 which is electrically or optically connected to the shackle 1101. The sensor signal is then transmitted through the fiber optic cable 1104 and received by the optical receiver sensor 1107. Once the signal is received by the receiver 1107, the signal is analyzed by the driver PCA 1108 to detect any tampering.

Although an optical signal is mainly described above, if the sensor 1102 includes a metal conductor 1002 as in FIG. 10, some components in the eLockBox 600 will be electrical components rather than optical components. For example, the cable 1110 can be a metal conductor which can conduct an electrical signal, the transmitter 1111 can be an electrical signal generator, the cable 1104 can be a metal cable, and the receiver sensor 1107 can be an electrical signal receiver.

If the eLockBox 600 is being tampered with, the signal received by the receiver sensor 1107 will not match the stored optical or electrical signature. In this case, a signal is sent to the server so that the owner or operator of the eLockBox 600 can be notified of tampering.

The light or electrical signal that is transmitted through the loop can be transmitted at a regular interval, e.g., every 5 seconds, 10 seconds, 1 minute, etc. This way, the owner or operator of the eLockBox 600 can be notified in real-time when someone is trying to tamper with the goods inside the container.

The ordering of steps and components illustrated in the figures above is not limiting. The methods and components are readily amended by omission or re-ordering of the steps and components illustrated without departing from the scope of the disclosed embodiments.

By this description a novel way to protect shipping containers with products inside has been described. A description of the type of power sources that can be used, packaging techniques typically used to incorporate the Electrical Shield Wallpaper loop and, the algorithms used to test the electrical characteristics may all use a variety of different technologies and techniques.

The various illustrative logical measurement techniques and processes to generate a Pedigree may be implemented in a variety of combined approaches. The specifics of the apparatus used to test electrical responses used to generate the Electrical Signature information can be expected to vary depending on the specific implementation of the described technology. The described functionality in varying ways for each particular application for different types of parts, systems, equipment and other shipment products, but such implementation decisions should not be interpreted as causing a departure from the scope of the present invention.

Variation of conductive ink characteristics can be dependent on temperature at the measurement location, package and container deformations. The operator can adjust the resistance of capacitance characteristic measurement thresholds to account for those effects.

The steps of a method or algorithm described in connection with the embodiments disclosed herein may be embodied directly in hardware, in a software module executed by a processor, or in a combination of the two.

An external Electrical lock securing the doors of the container may be used to further secure the opening of the container to provide a physical security barrier that mechanically opposes the unauthorized opening of the container.

The previous description of the disclosed embodiments is provided to enable the use of the present technology. Various modifications to these embodiments, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for detecting tampering, comprising:
a sensor with two opposing ends; and
a lock body connected to the two opposing ends of the sensor, the lock body comprising:
a transmitter configured to transmit a signal through the sensor; and
a receiver configured to receive the signal from the sensor;
wherein the lock body is coupled to at least one additional sensor arranged around a container, the at least one additional sensor including at least one of an electrical shield wallpaper and an optical shield wallpaper.

2. The system of claim 1, wherein the lock body includes a combination lock configured to receive an input by a user, and wherein the combination lock is configured to disconnect one of the two opposing ends of the sensor.

3. The system of claim 1, wherein one end of the sensor is fixed to the lock body and connected to the receiver.

4. The system of claim 1, wherein the sensor includes an optical fiber.

5. The system of claim 1, wherein the sensor includes an electrical conductor.

6. The system of claim 1, wherein the at least one additional sensor includes an electrical shield wallpaper arranged around the container.

7. The system of claim 1, wherein the at least one additional sensor includes an optical shield wallpaper arranged around the container.

8. The system of claim 1, wherein the at least one additional sensor is wirelessly connected to the lock.

9. The system of claim 1, wherein the at least one additional sensor includes a plurality of additional sensors, and wherein each of the additional sensors is configured to respectively communicate with the lock body via wired or wireless communication.

10. The system of claim 1, wherein the lock body further includes:
   a latching hole configured to receive a first one of the two opposing ends of the sensor, wherein the latching hole is configured to release the first one of the two opposing ends; and
   a fixed hole configured to receive a second one of the two opposing ends of the sensor, wherein the fixed hole is configured to not release the second one of the two opposing ends of the sensor.

11. The system of claim 10, wherein the lock body further includes a first cable connected to the fixed hole and the receiver and configured to transmit the sensor signal received at the fixed hole to the receiver.

12. The system of claim 11, further comprising a second cable configured to transmit a sensor signal from a driver circuit to the end of the sensor inside the latching hole.

13. The system of claim 12, wherein the first and second cables include optical fiber cables.

14. The system of claim 12, wherein the first and second cables include electrical conductors.

15. The system of claim 10, wherein the centers of the latching hole and the fixed hole are less than 20 cm apart.

16. The system of claim 10, wherein the centers of the latching hole and the fixed hole are less than 10 cm apart.

17. The system of claim 1, further comprising an external antenna configured to communicate with the lock body.

18. The system of claim 1, wherein the lock body includes a GPS receiver.

19. The system of claim 1, wherein the lock body includes a motion detector.

20. The system of claim 1, wherein the lock body includes a camera.

21. The system of claim 1, wherein the lock body includes an event recorder.

22. The system of claim 1, wherein the sensor is less than 30 cm long.

23. The system of claim 1, wherein the container contains a medicine.

* * * * *